United States Patent
Krishnamurthy et al.

(10) Patent No.: US 11,663,452 B2
(45) Date of Patent: May 30, 2023

(54) PROCESSOR ARRAY FOR PROCESSING SPARSE BINARY NEURAL NETWORKS

(71) Applicant: Intel Corporation, Santa Clara, CA (US)

(72) Inventors: Ram Krishnamurthy, Portland, OR (US); Gregory K. Chen, Portland, OR (US); Raghavan Kumar, Hillsboro, OR (US); Phil Knag, Hillsboro, OR (US); Huseyin Ekin Sumbul, Portland, OR (US); Deepak Vinayak Kadetotad, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 822 days.

(21) Appl. No.: 16/583,217

(22) Filed: Sep. 25, 2019

(65) Prior Publication Data

US 2020/0019847 A1  Jan. 16, 2020

(51) Int. Cl.
G06F 17/16 (2006.01)
G06N 3/063 (2006.01)
G06F 7/544 (2006.01)
G06N 3/04 (2023.01)

(52) U.S. Cl.
CPC .......... *G06N 3/063* (2013.01); *G06F 7/5443* (2013.01); *G06F 17/16* (2013.01); *G06N 3/04* (2013.01)

(58) Field of Classification Search
None
See application file for complete search history.

(56) References Cited

U.S. PATENT DOCUMENTS

| | | | |
|---|---|---|---|
| 2017/0193368 A1* | 7/2017 | Le Grand | G06N 3/084 |
| 2018/0046897 A1* | 2/2018 | Kang | G06N 3/0445 |
| 2018/0253635 A1* | 9/2018 | Park | G06F 7/523 |
| 2019/0164043 A1* | 5/2019 | Litvak | G06N 3/063 |
| 2019/0294968 A1* | 9/2019 | Vantrease | G06N 3/063 |
| 2019/0347555 A1* | 11/2019 | Park | G06N 3/082 |
| 2020/0035305 A1* | 1/2020 | Choi | G11C 11/54 |
| 2020/0159809 A1* | 5/2020 | Catthoor | G06N 3/063 |

\* cited by examiner

*Primary Examiner* — Joni Hsu
(74) *Attorney, Agent, or Firm* — Compass IP Law PC

(57) ABSTRACT

An apparatus is described. The apparatus includes a circuit to process a binary neural network. The circuit includes an array of processing cores, wherein, processing cores of the array of processing cores are to process different respective areas of a weight matrix of the binary neural network. The processing cores each include add circuitry to add only those weights of an i layer of the binary neural network that are to be effectively multiplied by a non zero nodal output of an i−1 layer of the binary neural network.

20 Claims, 11 Drawing Sheets

PROCESSOR ARRAY FOR PROCESSING SPARSE BINARY NEURAL NETWORKS

FIELD OF INVENTION

The field of invention pertains generally to the computing sciences, and, more specifically, to a processor array for processing sparse binary neural networks.

BACKGROUND

Artificial intelligence, machine learning and/or other processes that execute over a neural network are receiving heightened attention in the technology industry. Neural networks can be numerically intensive, and, as such, semiconductor chip designers are looking for ways to reduce the intensity of their computations.

FIGURES

A better understanding of the present invention can be obtained from the following detailed description in conjunction with the following drawings, in which.

DETAILED DESCRIPTION

Figure 1:
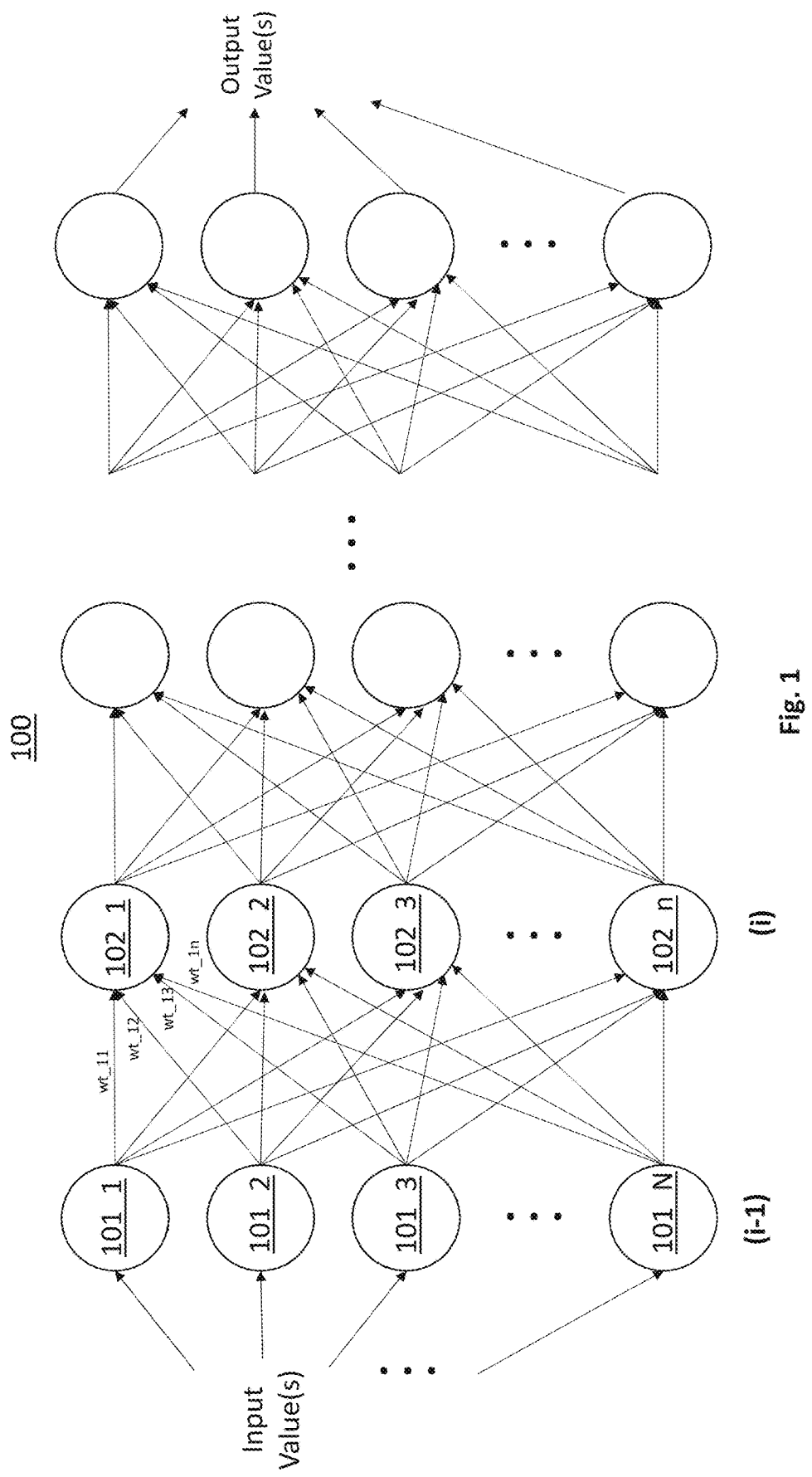
FIG. 1 shows a neural network.

A neural network is the basic computational structure for Artificial Intelligence (AI) and/or machine learning applications. FIG. 1 depicts an exemplary neural network 100. As observed in FIG. 1 the inner layers of a neural network can largely be viewed as layers of neurons 102 that each receive weighted outputs from the neurons of another preceding layer of neurons 101 in a mesh-like interconnection structure between layers.

The weight of the connection from the output of a particular preceding neuron 101 to the input of another subsequent neuron 102 is set according to the influence or effect that the preceding neuron is to have on the subsequent neuron (for ease of drawing the weights of the input connections to only one neuron 102_1 from its preceding neurons 101 are labeled). Here, the output value of the preceding neuron is multiplied by the weight of its connection to the subsequent neuron to determine the particular stimulus that the preceding neuron presents to the subsequent neuron.

A neuron's total input stimulus corresponds to the combined stimulation of all of its weighted input connections. According to various implementations, the combined stimulation is calculated as a multi-dimensional (e.g., vector) multiply accumulate operation. Here, output values from preceding neurons are multiplied by their respective weights to produce a set of products. The set of products are then accumulated (added) to generate the input stimulus to the receiving neuron. A mathematical function is then performed using the stimulus as its input which represents the processing performed by the receiving neuron. That is, the output of the mathematical function corresponds to the output of the neuron which is subsequently multiplied by the respective weights of the neuron's output connections to its following neurons.

Figure 2:
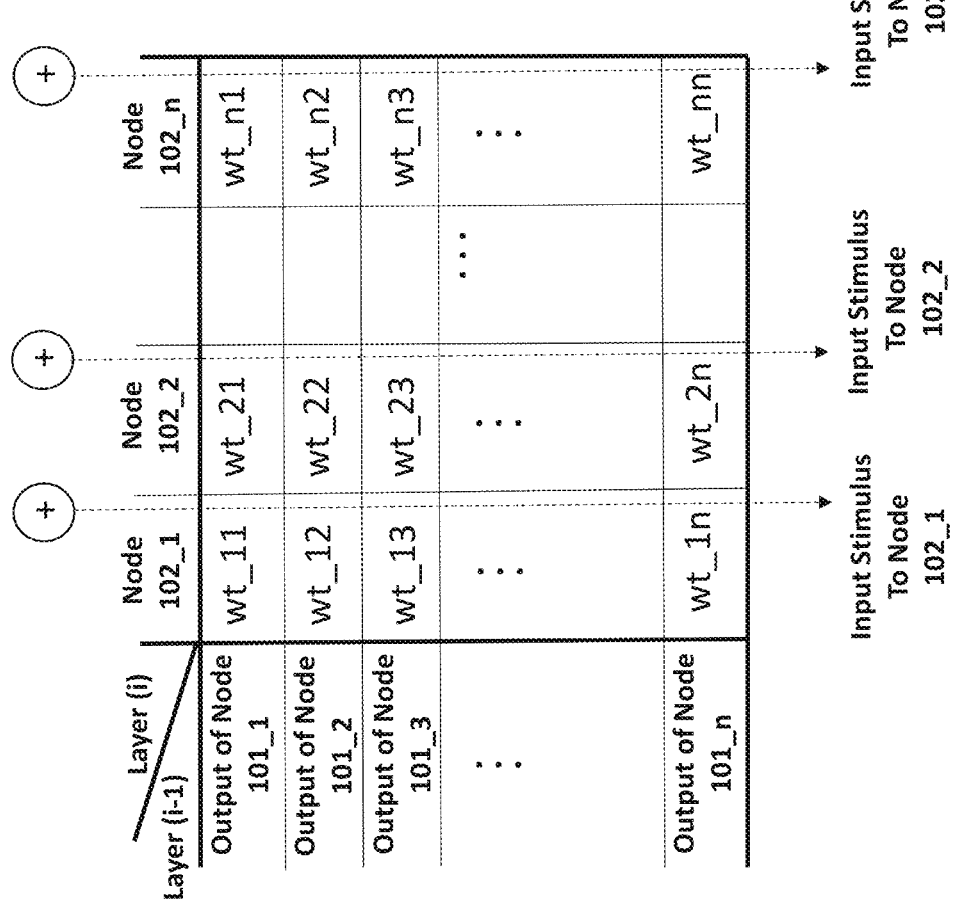
FIG. 2 shows a weight matrix for a neural network

FIG. 2 depicts, in a matrix format, the computations that determine the respective input stimuli for a layer of nodes in a neural network layer. Here, each column in the matrix corresponds to a different node in the layer (i) for which input stimuli is to be computed and each row corresponds to the output of a different node in the preceding layer (i−1). As can be seen in FIG. 2, the weights are organized such that weights that are directed to a same receiving node of layer (i) fall within a same column, and, weights that are directed from the output of a same node of the preceding layer (i−1) fall within the same row.

According to this matrix format, each weight along a same row is multiplied by the nodal output value of the preceding layer that is aligned with the row (all weights in the first row are multiplied by the output value of node 101_1, all weights in the second row are multiplied by the output value of node 101_2, etc.). After these multiplications are performed, which result in n×n separate product terms, product terms along a same column are added in order to generate the input stimulus for the layer (i) node that corresponds to that column. The resultant is a vector of n summation terms where each element in the vector corresponds to an input stimulus for a particular layer (i) node. The vector can then be applied to an array of mathematical functions that represent the mathematical functions performed by the nodes of layer i.

The mathematical functions performed by the nodes of a class of neural networks, referred to as binary neural networks (BNNs) (e.g., thresholding neural networks), express their outputs as binary values. That is, the mathematical output that is provided by any node in the neural network is a 1 or a 0. An inefficiency can exist in the case of "sparse" BNNs. A BNN is "sparse" if a substantial percentage of the nodes of any preceding layer generate a 0 output value. If a substantial percentage of the nodes of a preceding layer generate a 0 output value, then, the matrix of n×n product terms that are calculated for the input stimulus of the subsequent layer will contain a substantial number of 0s.

The subsequent columnar summations over the n×n matrix of product terms to determine the input stimulus for the nodes of the subsequent layer will therefore also contain a large number of additions by 0. Addition by 0 does not affect the final input stimulus and is therefore a wasted effort.

Figure 3:
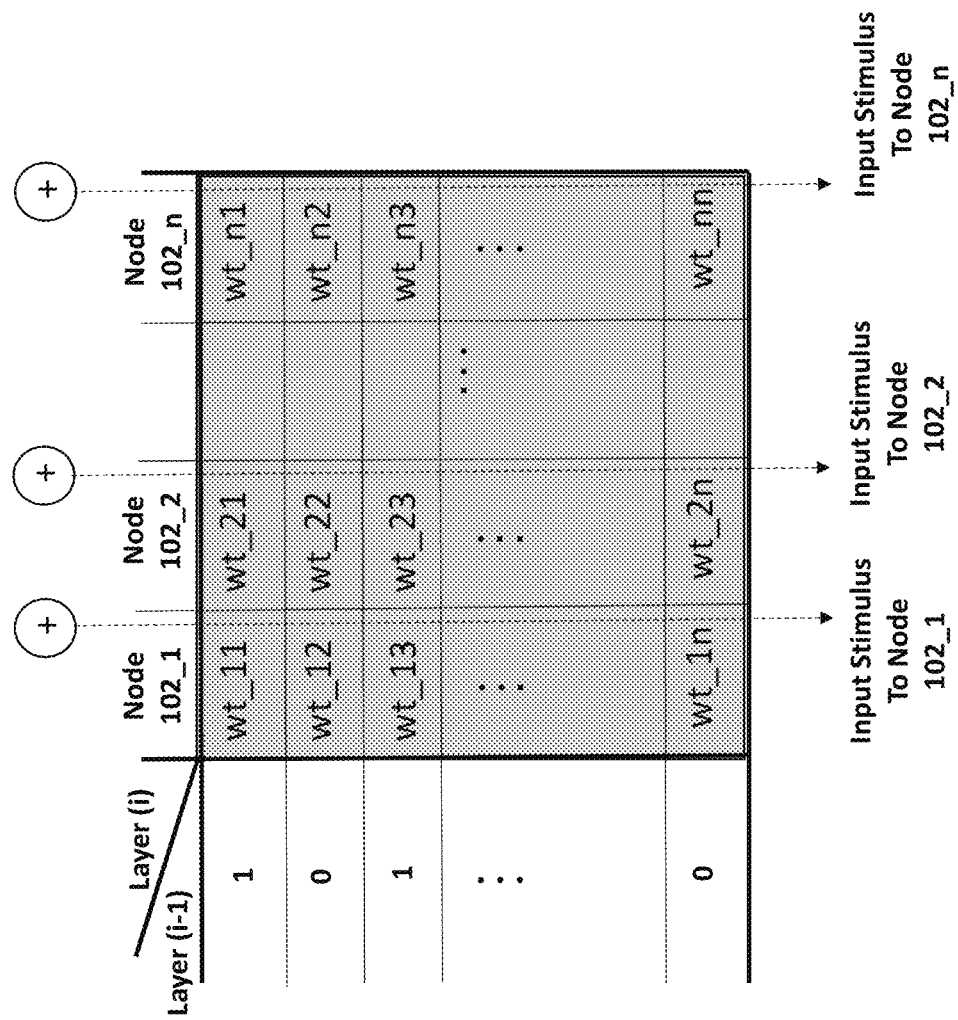
FIG. 3 shows traditional processing of a binary neural network.

FIG. 3 illustrates the inefficiency of a sparse BNN in more detail. Here, the respective outputs of only nodes 101_1 and 101_3 are non-zero. That is, the respective outputs of all nodes in the (i−1) layer, other than nodes 101_1 and 101_3, are 0. If all product terms across the n×n matrix are calculated, note that all rows in the n×n product term matrix, except the first and third rows, will contain all 0s. As such, the columnar summations will effectively sum over only two values (the value in the first row and the value in the third row).

Nevertheless, if all n×n multiplications are performed to generate the full n×n product term matrix, and if all n terms are added per column in the matrix to determine the per node input stimulus (executions that are graphically represented in FIG. 3 by shading the entire matrix), note the large number of multiplication operations and summation operations that have no affect on an input stimulus value. Performing such large numbers of irrelevant calculations can be viewed as either or both of a performance or power consumption inefficiency.

Figure 4:
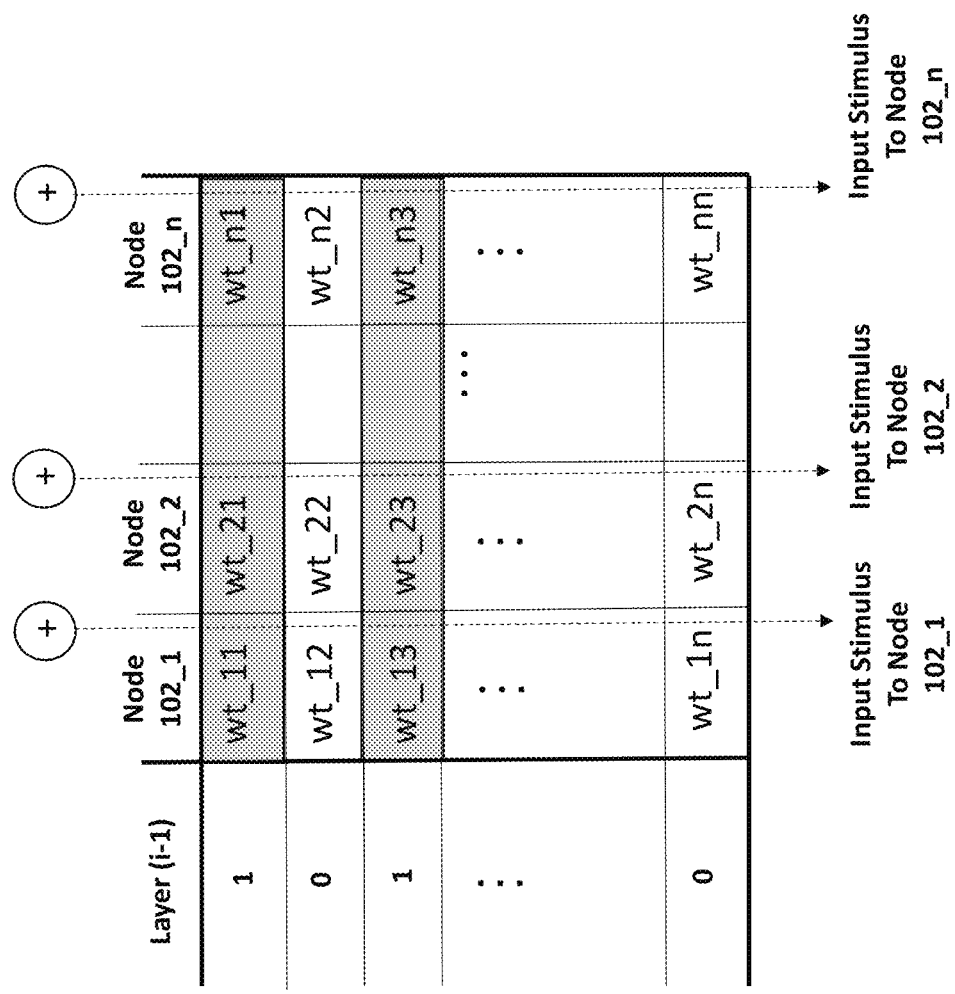
FIG. 4 shows improved processing of a binary neural network.

FIG. 4 graphically illustrates an improved approach in which calculations are only performed for preceding layer nodes having non-zero output values (represented in FIG. 4 by shading only the first and third rows). Here, product terms are only calculated for the first and third rows of the matrix, and, columnar summations are only made for the first and third rows for each column. As such, whereas the inefficient approach of FIG. 3 would include n×n separate multiplication calculations and n×n separate addition calculations, by contrast, the improved approach of FIG. 4 would only perform 2n separate multiplication calculations and 2n separate addition calculations. For large n, which is common for actual neural networks, the reduction in computations is profound (the inefficient approach of FIG. 3 performs $2(n^2)$ total calculations whereas the efficient approach performs 4n calculations).

Figure 5:
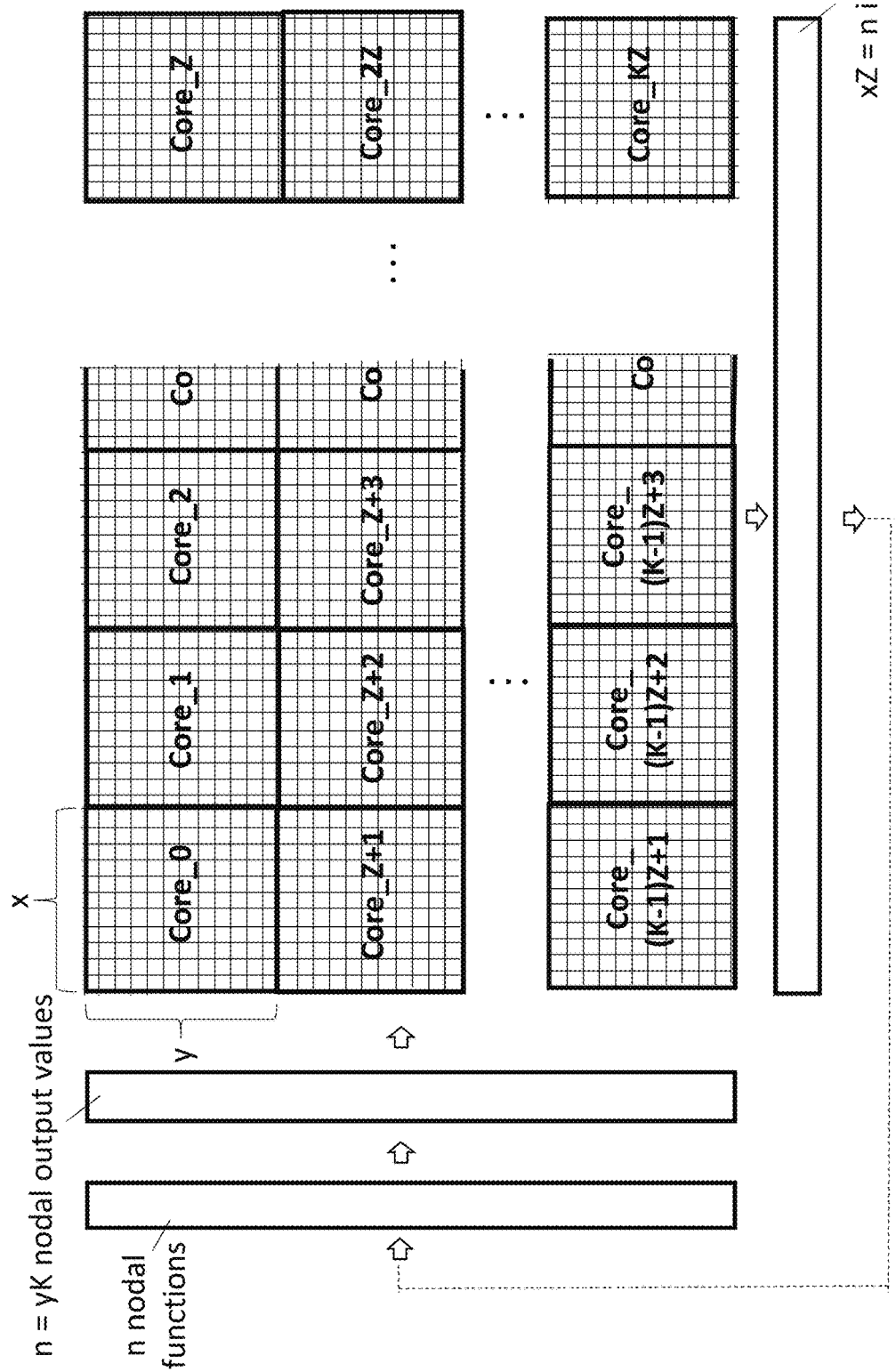
FIG. 5 shows a first view of a processor array for processing a binary neural network.

FIGS. 5 through 7a,b pertain to a design for, e.g., a co-processor, application specific integrated circuit (ASIC) block or other function dedicated to performing BNN computations. As observed in FIG. 5, the overall design can be viewed as a processor array where each processing core performs computations, in-line with those described just above with respect to FIG. 4, over a "surface area" of the weight matrix. Here, it is pertinent to point out that in the exemplary weight matrices of FIGS. 2, 3 and 4, n can be large (e.g., hundreds, thousands, tens of thousands, etc.). FIG. 5 depicts more locations in the weight matrix so that the architecture of the processor array can be better understood.

As observed in FIG. 5, core_0 performs computations over an upper left hand corner surface area of the weight matrix, core_1 performs computations over a surface area of the weight matrix that is adjacent and to the right of the surface area that core_0 performs computations over, core_(Y−1)X+1 performs computations over a lower left hand corner surface area of the weight matrix, etc. Each surface area includes a section of y rows and x columns of the weight matrix. Thus, for instance core_0 performs calculations over the weights that are in a first section of x columns and a first section of y rows of the weight matrix, core_1 performs calculations over the weights that are in a second, next section of x columns along the first section of y rows, etc.

Figure 6:
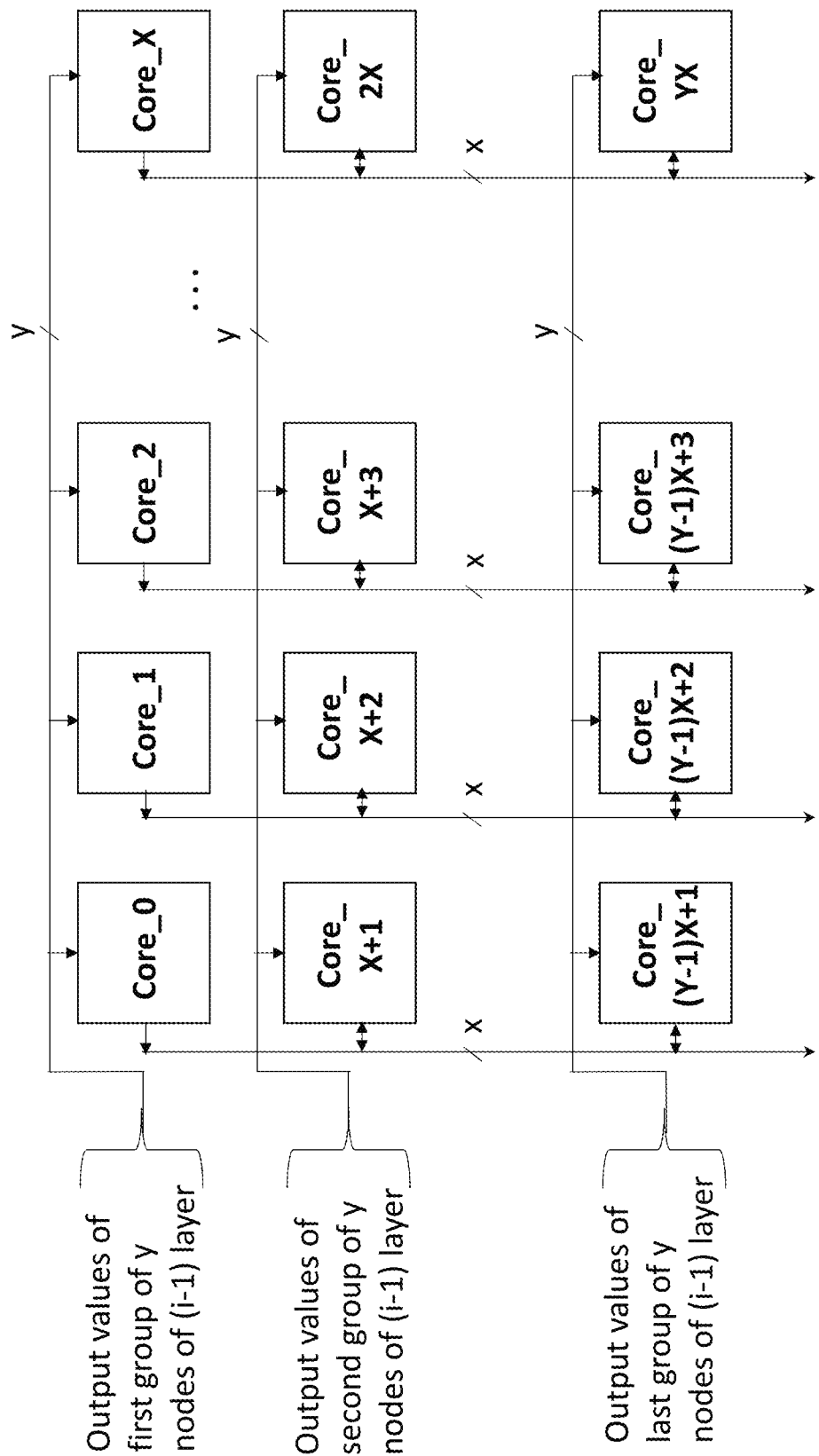
FIG. 6 shows a second view of a processor array for processing a binary neural network.

FIG. 6 presents a high level view of the processor array. As observed in FIG. 6, the processor array includes the aforementioned processing cores organized into a network. The network has both horizontal components and vertical components. Each horizontal component corresponds to a segment of y rows of the weight matrix that the cores that are coupled to that horizontal component are to process. As such, each horizontal component is responsible for loading into its respective cores the respective output values from a group of y nodes of the preceding neural network layer that are aligned with the y rows of the weight matrix that the cores are to perform computations over.

Each core has internal memory to keep the weights of the surface area of the weight matrix that the core is to perform computations over. Each core also has the capacity to multiply each of the y nodal output values that it receives by each of the x weights that are aligned with the respective row of each one of the y nodal output values (there are y different sets of x weights stored in the core's memory).

However, consistent with the discussion above of FIG. 4, such multiplication will only be performed for a received nodal value if the received nodal value has a non-zero value. If all y nodal output values that a core receives are zero, the core will not perform any weight multiplications or product term summations. If only one of the y nodal output values received by the core is not zero valued (has a value of 1), the core will only effectively perform x weight multiplications (one multiplication for each of the x columns that the row of the weight matrix with the non zero nodal output value corresponds to). If only two of the y nodal output values received by the core have a value of 1, the core will only effectively perform 2x weight multiplications (one set of x multiplications for the first non-zero nodal output value and another set of x multiplications for the second non-zero nodal output value), and so on.

Each core also includes adder circuitry to add products from more than one row of the weight matrix in a columnar direction. That is, for example, if two of the y values that a core receives are non-zero, the pair of products for each column in the core's weight matrix surface area are also added by the core along the columnar direction. As such, the core will generate x output values (one for each of the x columns of the weight matrix that the core executes over) that each correspond to the summation of both products that were determined along a particular column from the pair of rows having a non zero nodal output value. The vector of x outputs calculated by a core can be referred to as a vector partial sum.

After a core has generated its vector partial sum, the vector partial sum is directed vertically down a vertical component of the network. The vector partial sums of all cores coupled to a same vertical component are added in vector fashion with their vector elements respectively aligned so that x unique final sums are generated per vertical network component. The vector partial sums may be added sequentially down the vertical component in a processor by processor fashion until the "bottom" processor is reached, or, each core output may be directed to a unique input of a vector adder resides at the bottom of the vertical component. Regardless, the x unique final sums correspond to x stimuli to be applied to x nodes of the current BNN layer being computed. After the nodes of the current BNN layer generate their respective output values in response to these stimuli, the output values correspond to the nodal values of the (i−1) layer to be applied to the next iteration of the processor array.

As different layers may take different amounts of time to compute (e.g., a subsequent layer that receives many zero valued nodal outputs will complete faster than a subsequent layer that receives many non-zero valued nodal outputs) and since a following layer typically cannot start until its preceding layer completes, the overall flow through processor error through the BNN will be event driven (a next layer starts after the preceding layer completes).

Figure 7A:
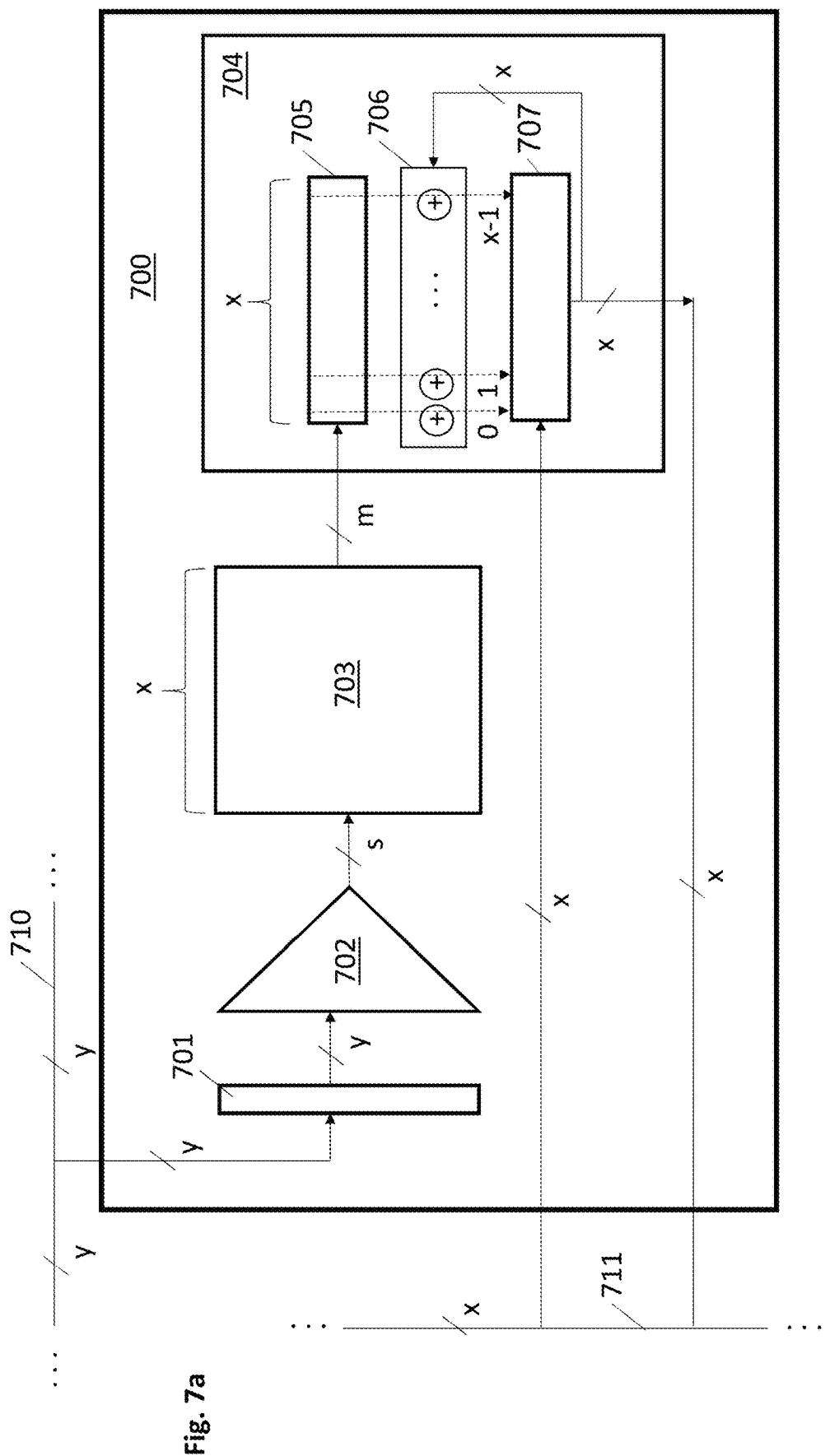
FIGS. 7a and 7b show embodiments for a processor of the processor arrays of FIGS. 5 and 6.

FIG. 7a shows a high level view of an embodiment of a processing core 700. As observed in FIG. 7 the processing core 700 includes a buffer 701 that is coupled to a horizontal component of the network 710. During operation, the buffer 701 receives and queues the y nodal output values from the previous layer that the core 700 is to perform computations over. The buffer 701 is coupled to a priority encoder circuit 702 that flags each of they bit values in the buffer that are non zero (depicted as s in FIG. 7).

The priority encoder circuit 702 then triggers selection from internal memory 703 of a vector of x weights for each non zero nodal output value (in an embodiment, the priority encoder generates the appropriate memory address to apply to internal memory 703). Here, again, the internal memory 703 can be viewed as having x columns and y rows of weight values. Each row in the internal memory 703 corresponds to a different one of they received nodal output value bits, and, there are x weights along each row. Said another way, there are x unique weights per non zero nodal output value. For each non zero nodal output value, the priority encoder circuit 702 reads the x weights for that output value and enters them into a multiply-accumulate circuit (MAC) 704.

The MAC 704 includes internal register space 705 that can be viewed as having m rows and x columns. In an embodiment m<y such that, under a worst case scenario where all y nodal output values are non-zero, the MAC's register space 705 does not have the capacity to simultaneously store all y weight vectors that are selected from the internal memory 703.

Instead, the priority encoder circuit 702 reads vectors in groups of size m from the internal memory 703 and enters them into the register space 705 of the MAC 704. The MAC then proceeds, with a vector adder 706, to add the values in its register space 705 in a columnar direction (i.e., along each of the x columns) which produces a vector of x elements in the MAC's partial sum register 707. Here, note that in the case of a BNN, because non-zero output values are expressed as a 1, straight addition of the weight elements corresponds to the multiplication of the (i−1) nodal output values that feed into a same (i) node by their respective weights and then summing the resulting products.

If there are more weight vectors to forward from the internal memory to the MAC's register space after a first selection of m weight vectors, the priority encoder circuit 702 will select a next group of up to m weight vectors and perform a vector add that includes adding in vector-wise fashion the previously determined sum that is stored in the partial sum register 707 and store the result back into the partial sum register 707. The process continues until weight vectors of all non zero nodal output values are summed by the MAC 704. The resulting partial sum in the partial sum register 707 is then forwarded to the vertical component of the network 711 for downward propagation (e.g., to the immediately lower core which places the partial sum in its partial sum register, or, an adder at the bottom of the processor array).

Figure 7B:
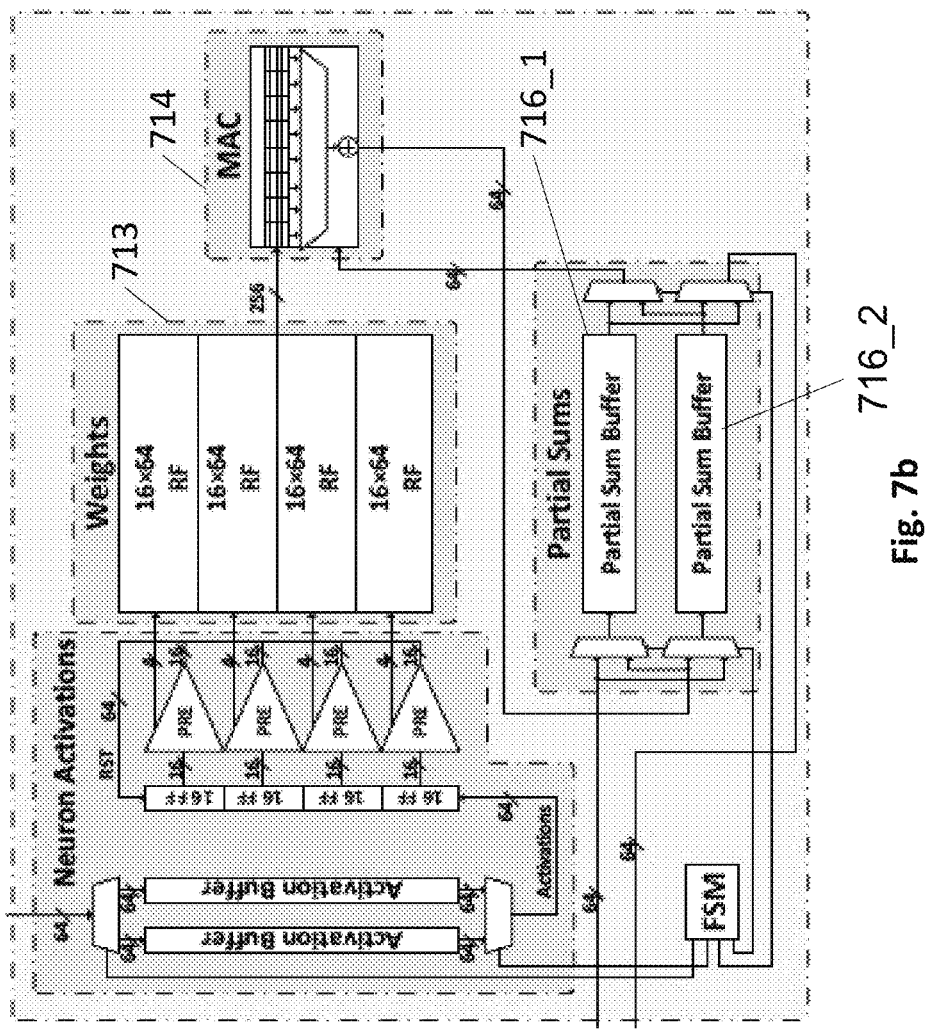

FIG. 7b shows a more detailed embodiment where the weight matrix surface area has dimensions of 64×64. Here, the MAC's register space can only accept four 64 element weight vectors. The priority encoder circuitry and internal memory 713 are partitioned into four groups 16 rows of the weight matrix surface area. Two partial sum registers 716_1, 716_2 are included to enable pipelining between different partitions of the weight matrix. That is, during a same cycle, weights from a first partition are written into the MAC and a partial sum vector from a second partition is written into the one of the partial sum registers 716. Then, during a subsequent cycle, weights from the second partition are written into the MAC and a partial sum from the first partition is written into the other partial sum register. When partial sums from both partitions are complete the partial sums are added to converge toward a final, single partial sum for the core's iteration.

The core also includes two separate buffers capable of storing y nodal output values. Here, when the core receives y nodal output values from its horizontal component of the network. The y values are written into both buffers. Different elements of the different buffers are then forwarded to the priority encoder circuit in parallel to improve throughput of the non zero flagging decision state for each row.

In various embodiments the weights for a BNN can be either 1 or −1. As such the vector adder and partial sum registers should be able to add/store positive and negative numbers. Note that the above described weight matrix and internal memory to store the weight values were sufficient for a single layer of BNN computation. In between layers, new matrices of weight values may be written into the internal memory that correspond to the next layer to be processed.

With respect to training, the objective of training is to achieve high machine learning accuracy with binary weights $\{-1, 1\}$ and activations $\{0, 1\}$. In one embodiment, training is performed offline with gradient descent backpropagation and batch normalization. However, any other offline training method can be implemented as long as the network can be constructed with binarized weights and sparse neuron activations for the inference task.

For training, a straight through estimator (STE) approximates the step activation function that is used during inference. The STE is a positive-slope straight line, with y values clipped at either $\{0, 1\}$ or $\{-1, 1\}$. The STE is required since it has a non-zero derivative defined for a range of points on x, which is required for error backpropagation. Full precision weights and activations are used for training, and the error backpropagation algorithm is performed with no modification other than the STE activation function and its derivative. Another method of training uses the step function for the forward pass, and STE for the backward pass. After training, the weights are binarized using the sign function, and during inference the step function binarizes the activations.

During inference, STE function is replaced with a step function such that the neuron activations can be binarized. Sign or step functions can be used for tan h or sigmoid functions, respectively. Sign function will provide neuron weights of −1 and 1, whereas step function will provide neuron activations of 0 and 1. To make the neuron activations sparse, threshold of the sign or step function is changed. For instance for step function, by shifting the step function to the right will result in more sparse activations, as fewer neurons will get activated. Threshold value can be changed to increase the inference accuracy, as sparsity depend on its value.

Figure 8A:
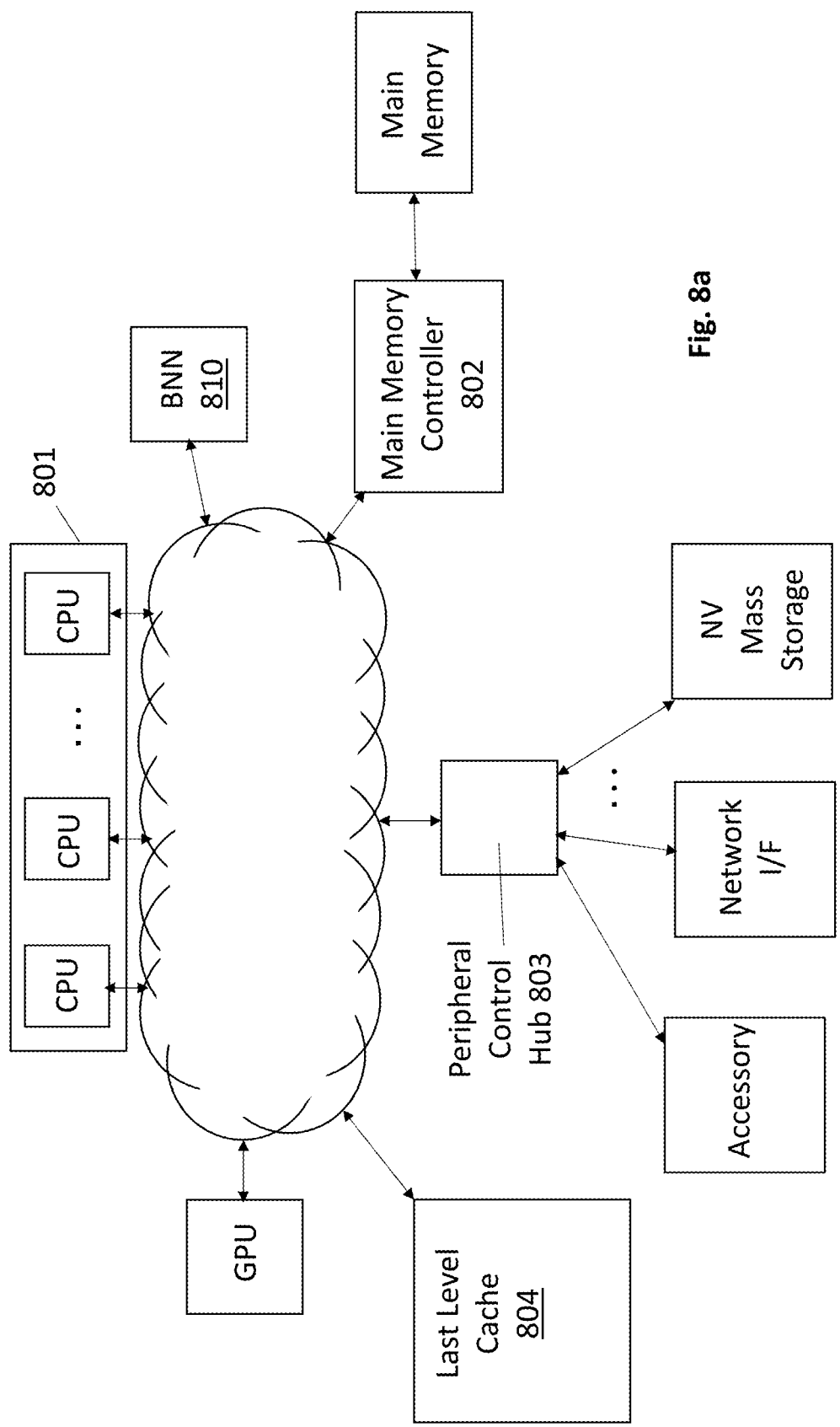
FIGS. 8a and 8b show different possible implementations of the processor arrays of FIGS. 5 and 6.
Figure 8B:
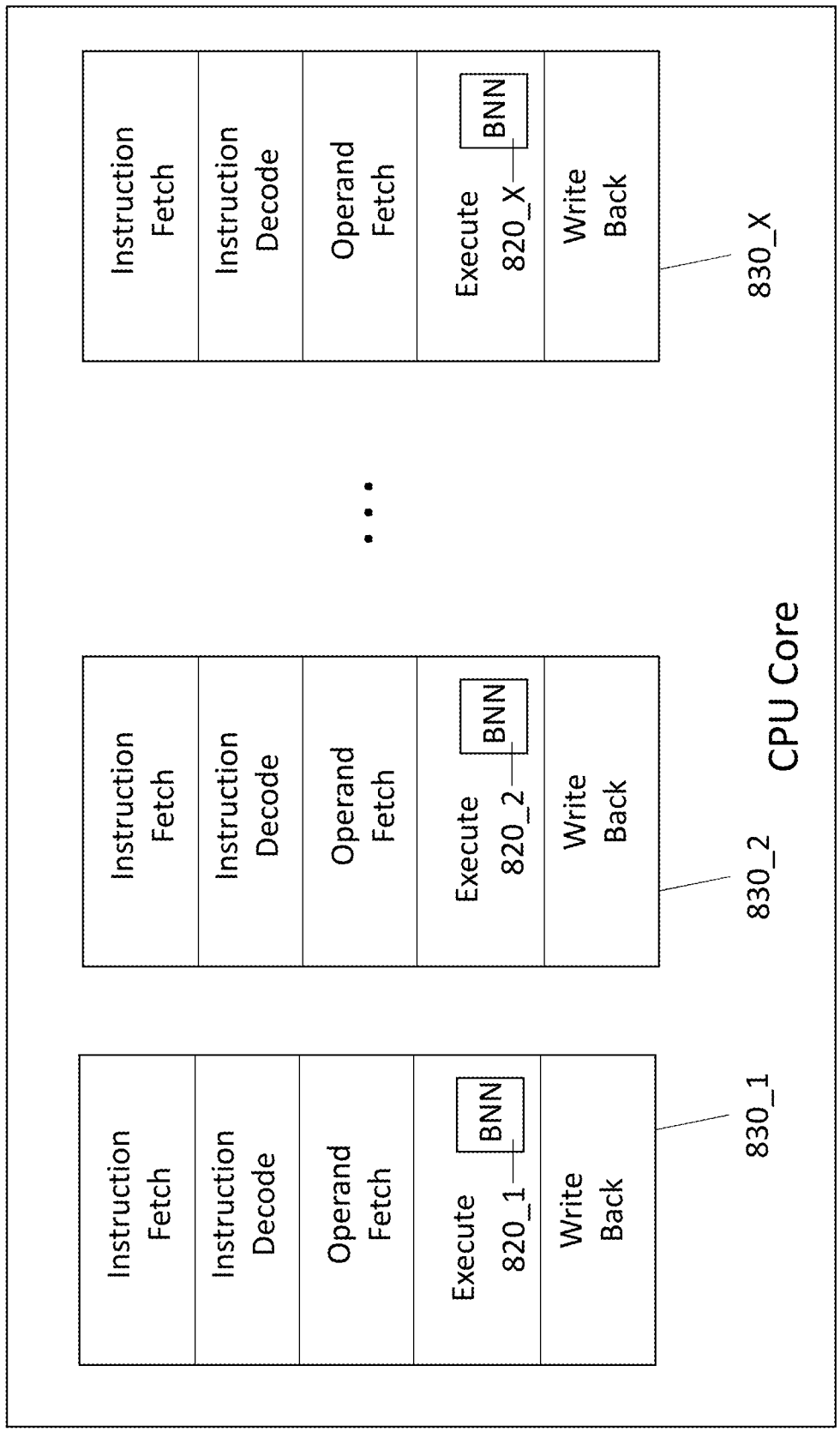

FIGS. 8a and 8b show different embodiments by which a processor array as described above for implementing a neural network in electronic circuitry, e.g., for artificial intelligence applications may be integrated into a computing system. FIG. 8a shows a first approach in which the processor array circuit 810 is integrated as an accelerator or co-processor to the processor's general purpose CPU processing core(s) 801. Here, an application software program that is executing on one or more of the CPU cores 801 may invoke an artificial intelligence function.

The invocation of the artificial intelligence function may include, e.g., an invocation command that is sent from a CPU core that is executing a thread of the application and is directed to the processor array accelerator 810 (e.g., the invocation command may be supported by the CPU instruction set architecture (ISA)). The invocation command may also be preceded by or may be associated with the loading of configuration information into the processor array accelerator hardware 810.

Such configuration information may, e.g., define weights of inter-nodal connections and/or define math functions to be performed by the nodal mathematical function circuits. With respect to the later, the accelerator's mathematical function circuits may be capable of performing various math functions and which specific function is to be performed needs to be specially articulated/configured for various math circuits or various sets of math circuits within the accelerator 810 (e.g., the math circuitry configuration may partially or wholly define each neuron's specific math function). The configuration information may be loaded from system main memory and/or non volatile mass storage.

In various embodiments, the CPU cores 810, main memory controller 802, peripheral control hub 803 and last level cache 804 are integrated on a processor semiconductor chip. The hardware accelerator 810 may be integrated on the same processor semiconductor chip or may be an off-chip accelerator. In the case of the later, the hardware accelerator 810 may still be integrated within a same semiconductor chip package as the processor or disposed on a same interposer with the processor for mounting to, e.g., a larger system motherboard. Further still the accelerator 810 may be coupled to the processor over some kind of external connection interface (e.g., PCIe, a packet network (e.g., Ethernet), etc.).

FIG. 8b shows another embodiment in which a BNN execution unit 820 (also referred to as functional unit) that includes the processor array described at length above is added to the execution units (or functional units) of the instruction execution pipeline(s) 830 of a general purpose CPU processing core. FIG. 8b depicts a single CPU core having multiple instruction execution pipelines 830 where each instruction execution pipeline is enhanced to include a BNN execution unit 820 for supporting neural network/artificial intelligence processing (for simplicity the traditional execution units used to support the traditional ISA are not shown). Here, the ISA of each instruction execution pipeline may be enhanced to support an instruction that invokes the BNN execution unit. The execution of the BNN instruction may be similar to the invocation of the BNN accelerator described just above with respect to FIG. 8a although on a smaller scale. Depending on implementation, execution of an instruction executes an entire BNN, or just a layer of a BNN. In the case of the later a full is computed by looping or other invoking multiple BNN instructions.

Figure 9:
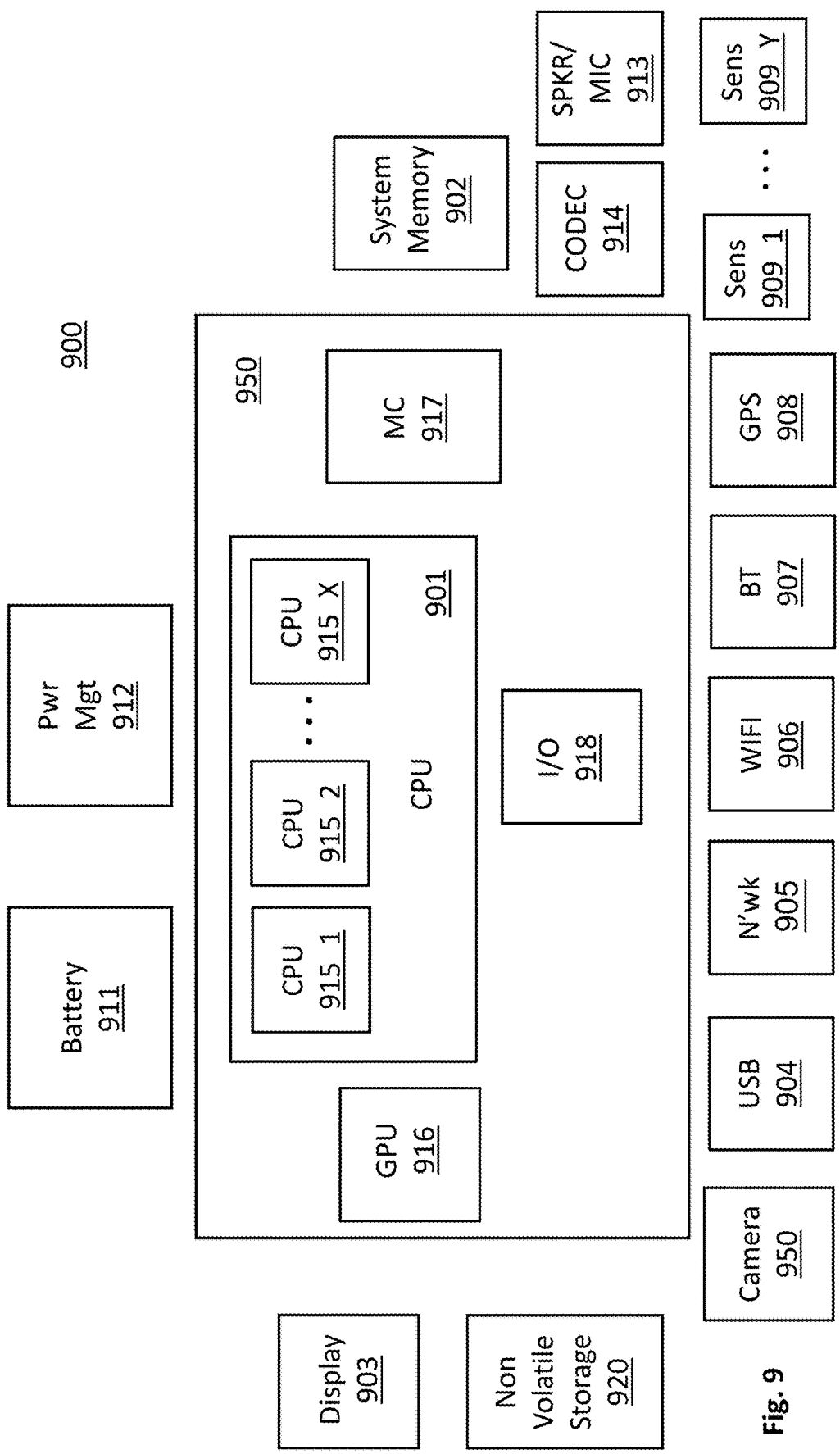
FIG. 9 shows a computing system.

FIG. 9 provides an exemplary depiction of a computing system 900 (e.g., a smartphone, a tablet computer, a laptop computer, a desktop computer, a server computer, etc.). As observed in FIG. 9, the basic computing system 900 may include a central processing unit 901 (which may include, e.g., a plurality of general purpose processing cores 915_1 through 915_X) and a main memory controller 917 disposed on a multi-core processor or applications processor, system memory 902, a display 903 (e.g., touchscreen, flat-panel), a local wired point-to-point link (e.g., USB) interface 904, various network I/O functions 905 (such as an Ethernet interface and/or cellular modem subsystem), a wireless local area network (e.g., WiFi) interface 906, a wireless point-to-point link (e.g., Bluetooth) interface 907 and a Global Positioning System interface 908, various sensors 909_1 through 909_Y, one or more cameras 910, a battery 911, a power management control unit 912, a speaker and microphone 913 and an audio coder/decoder 914.

An applications processor or multi-core processor 950 may include one or more general purpose processing cores 915 within its CPU 901, one or more graphical processing units 916, a memory management function 917 (e.g., a memory controller) and an I/O control function 918. The general purpose processing cores 915 typically execute the operating system and application software of the computing system. The graphics processing unit 916 typically executes graphics intensive functions to, e.g., generate graphics information that is presented on the display 903. The memory control function 917 interfaces with the system memory 902 to write/read data to/from system memory 902. The power management control unit 912 generally controls the power consumption of the system 900.

Each of the touchscreen display 903, the communication interfaces 904-907, the GPS interface 908, the sensors 909, the camera(s) 910, and the speaker/microphone codec 913, 914 all can be viewed as various forms of I/O (input and/or output) relative to the overall computing system including, where appropriate, an integrated peripheral device as well (e.g., the one or more cameras 910). Depending on implementation, various ones of these I/O components may be integrated on the applications processor/multi-core processor 950 or may be located off the die or outside the package of the applications processor/multi-core processor 950. The computing system also includes non-volatile mass storage 920 which may be the mass storage component of the system which may be composed of one or more non volatile mass storage devices (e.g. hard disk drive, solid state drive, etc.).

The computing system may contain a processor array circuit to compute BNNs as described at length above.

Embodiments of the invention may include various processes as set forth above. The processes may be embodied in machine-executable instructions. The instructions can be used to cause a general-purpose or special-purpose processor to perform certain processes. Alternatively, these processes may be performed by specific/custom hardware components that contain hard interconnected logic circuitry or programmable logic circuitry (e.g., field programmable gate array (FPGA), programmable logic device (PLD)) for performing the processes, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, FLASH memory, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. An apparatus, comprising:
a circuit, the circuit comprising:
an array of processing cores, wherein, each of the processing cores of the array of processing cores are dedicated to processing a particular area of a weight matrix of any binary neural network that the circuit is to process, the processing cores each comprising add circuitry to add only those product terms from those weights of an i layer of the binary neural network that are to be effectively multiplied by a non zero nodal output of an i−1 layer of the binary neural network.

2. The apparatus of claim 1 wherein the processing cores each comprise storage space to store weights of the particular area of the weight matrix that each processing core is dedicated to.

3. The apparatus of claim 1 wherein the processing cores each comprise a buffer to store a vector of nodal outputs from the i−1 layer node.

4. The apparatus of claim 1 wherein the processing cores each comprise circuitry to identify non zero nodal outputs of the i−1 layer node.

5. The apparatus of claim 1 wherein the processing cores each comprise circuitry to select from internal storage space only those weights of the i layer of the binary neural network that are to be effectively multiplied by a non zero nodal output of the i−1 layer of the binary neural network.

6. The apparatus of claim 1 wherein the add circuitry is vector add circuitry to simultaneously add weights of more than one dimension of the weight matrix.

7. The apparatus of claim 6 wherein the vector add circuitry is coupled to register circuitry to store vectors of those weights of the i layer of the binary neural network that are to be effectively multiplied by a non zero nodal output of an i−1 layer of the binary neural network.

8. A computing system, comprising:
a plurality of central processing units;
an interface to a network;
a circuit, the circuit comprising:
an array of processing cores, wherein, each of the processing cores of the array of processing cores are dedicated to processing a particular area of a weight matrix of any binary neural network that the circuit is to process, the processing cores each comprising add circuitry to add only those product terms from those weights of an i layer of the binary neural network that are to be effectively multiplied by a non zero nodal output of an i−1 layer of the binary neural network.

9. The computing system of claim 8 wherein the processing cores each comprise storage space to store weights of the particular area of the weight matrix that each processing core is dedicated to.

10. The computing system of claim 8 wherein the processing cores each comprise a buffer to store a vector of nodal outputs from the i−1 layer node.

11. The computing system of claim 8 wherein the processing cores each comprise circuitry to identify non zero nodal outputs of the i−1 layer node.

12. The computing system of claim 8 wherein the processing cores each comprise circuitry to select from internal storage space only those weights of the i layer of the binary neural network that are to be effectively multiplied by a non zero nodal output of the i−1 layer of the binary neural network.

13. The computing system of claim 8 wherein the add circuitry is vector add circuitry to simultaneously add weights of more than one dimension of the weight matrix.

14. The computing system of claim 13 wherein the vector add circuitry is coupled to register circuitry to store vectors of those weights of the i layer of the binary neural network that are to be effectively multiplied by a non zero nodal output of an i−1 layer of the binary neural network.

15. The computing system of claim 8 wherein the processing cores, network interface and circuit to process the binary neural network are implemented on a same semiconductor chip.

16. The computing system of claim 8 wherein the processing cores, network interface and circuit to process the binary neural network are within a same semiconductor chip package.

17. A method, comprising:
concurrently processing different surface areas of a weight matrix of a binary neural network with different respective processing cores of a processor array, wherein, the different respective processing cores are dedicated to processing a same surface area of any binary neural network that the different respective processing cores are to process, wherein the concurrent processing by the different respective processing cores comprises each core ignoring weights of the weight matrix that are to be effectively multiplied by a nodal output value of zero.

18. The method of claim 17 further comprising each processing core selecting only those weights from an internal, respective weight matrix that are to be effectively multiplied by a non zero nodal output value.

19. The method of claim 17 further comprising different ones of the processing cores completing their respective processes in different amounts of time because they respectively ignore different numbers of weights of the weight matrix.

20. The method of claim 17 further comprising one processing core passing its partial sum to another processing core along a same dimension of the weight matrix.

* * * * *